United States Patent
Liu et al.

(10) Patent No.: US 12,147,850 B2
(45) Date of Patent: Nov. 19, 2024

(54) RESOURCE SCHEDULING METHOD AND APPARATUS FOR ENERGY STORAGE DEVICE POOL, DEVICE, SYSTEM, AND MEDIUM

(71) Applicant: HUAWEI TECHNOLOGIES CO., LTD., Guangdong (CN)

(72) Inventors: Chun Liu, Hangzhou (CN); Feng Chai, Fuzhou (CN); Weixiang Jiang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 26 days.

(21) Appl. No.: 18/147,232

(22) Filed: Dec. 28, 2022

(65) Prior Publication Data

US 2023/0138636 A1 May 4, 2023

Related U.S. Application Data

(63) Continuation of application No. PCT/CN2021/088707, filed on Apr. 21, 2021.

(30) Foreign Application Priority Data

Jun. 30, 2020 (CN) .......................... 202010617925.6

(51) Int. Cl.
*G06F 1/26* (2006.01)
*G06F 9/50* (2006.01)

(52) U.S. Cl.
CPC .............. *G06F 9/5094* (2013.01); *G06F 1/26* (2013.01)

(58) Field of Classification Search
CPC ................................ G06F 9/5094; G06F 1/26
See application file for complete search history.

(56) References Cited

U.S. PATENT DOCUMENTS

| | | | |
|---|---|---|---|
| 9,323,308 B1 | 4/2016 | Heath et al. | |
| 2005/0187727 A1* | 8/2005 | Weik ................. | H02J 13/00002 700/291 |
| 2012/0295574 A1* | 11/2012 | Chen ................... | H02J 7/00712 455/574 |

(Continued)

FOREIGN PATENT DOCUMENTS

| | | |
|---|---|---|
| CN | 103180164 A | 6/2013 |
| CN | 105576649 A | 5/2016 |

(Continued)

OTHER PUBLICATIONS

Yan et al., "Energy Storage Capacity Allocation Method With Cascade Utilization Based on Battery Health in Microgrids," Power System Technology, vol. 44, No. 5, May 2020, 9 pages (with English abstract).

(Continued)

*Primary Examiner* — Zahid Choudhury

(74) *Attorney, Agent, or Firm* — Fish & Richardson P.C.

(57) ABSTRACT

A resource scheduling method is provided. The energy storage device pool includes at least one energy storage device. One example method includes: receiving a resource scheduling application request, determining a target energy storage device from the energy storage device pool based on the resource scheduling application request, and allocating an electric power resource to a power consumption device by using the target energy storage device.

20 Claims, 5 Drawing Sheets

(56) References Cited

U.S. PATENT DOCUMENTS

| | | | |
|---|---|---|---|
| 2013/0320772 A1* | 12/2013 | Qiao | H01M 10/4207 |
| | | | 307/85 |
| 2016/0105044 A1 | 4/2016 | Yamaguchi et al. | |
| 2021/0168964 A1* | 6/2021 | Nakaya | H02J 7/0048 |
| 2022/0131381 A1* | 4/2022 | Sergott | H02J 3/48 |
| 2023/0138636 A1* | 5/2023 | Liu | H02J 7/0025 |
| | | | 713/340 |
| 2023/0275447 A1* | 8/2023 | Zhao | H02J 3/32 |
| | | | 320/134 |

FOREIGN PATENT DOCUMENTS

| | | |
|---|---|---|
| CN | 107482619 A | 12/2017 |
| CN | 109347170 A | 2/2019 |
| CN | 109936127 A | 6/2019 |
| CN | 110601194 A | 12/2019 |
| CN | 111064273 A | 4/2020 |
| CN | 111193306 A | 5/2020 |
| WO | 2019010126 A1 | 1/2019 |

OTHER PUBLICATIONS

International Search Report and Written Opinion in International Appln. No. PCT/CN2021/088707, mailed on Jul. 27, 2021, 15 pages (with English translation).

Extended European Search Report in European Appln No. 21832934.0, dated Nov. 2, 2023, 9 pages.

\* cited by examiner

RESOURCE SCHEDULING METHOD AND APPARATUS FOR ENERGY STORAGE DEVICE POOL, DEVICE, SYSTEM, AND MEDIUM

CROSS-REFERENCE TO RELATED APPLICATIONS

This application is a continuation of International Application No. PCT/CN2021/088707, filed on Apr. 21, 2021, which claims priority to Chinese Patent Application No. 202010617925.6, filed on Jun. 30, 2020. The disclosures of the aforementioned applications are hereby incorporated by reference in their entireties.

TECHNICAL FIELD

This application relates to the field of battery technologies, and in particular, to a resource scheduling method and apparatus for an energy storage device pool, a device, a system, and a medium.

BACKGROUND

A data center (DC) is a globally collaborative network of specific devices and is used to transmit, accelerate, display, compute, and store data information on Internet infrastructure. As the hub of an entire information technology (IT) system, the data center needs to ensure data security and high reliability to ensure normal running of the IT system.

One solution to ensure high reliability of the data center is to fixedly install one or more batteries in each cabinet to constitute a battery backup system. When a power supply system stops supplying power due to factors such as a power supply network fault, a power supply manner of the cabinet may be switched to battery power supply in a timely manner to ensure data security and avoid unexpected service interruption.

However, in an existing battery backup manner, backup batteries in each cabinet are independent of each other, and generally supply power only to the cabinet in which the backup batteries are located. Power consumption of different cabinets may be different, and unified management of energy storage devices cannot be implemented. For one thing, operation and maintenance workload of the data center is increased. For another thing, the foregoing usage manner does not fully utilize an electricity quantity of the backup battery, resulting in a waste of resources. Therefore, providing a cost-reducing backup battery management manner becomes an urgent technical problem to be resolved.

SUMMARY

This application provides a resource scheduling method and apparatus for an energy storage device pool, a device, and a system, so that resources can be scheduled on demand by performing pooling management on resources of an energy storage device, instead of being provided by the energy storage device fixedly for one or more power consumption devices. This implements leveling use of energy storage devices, and reduces operation and maintenance workload. In addition, resources of each energy storage device can be fully utilized, so that costs of a data center are reduced.

According to a first aspect, this application provides a resource scheduling method for an energy storage device pool. The method is specifically implemented through unified scheduling performed by a scheduling device on resources in an energy storage device pool. Specifically, the energy storage device pool includes at least one energy storage device. The scheduling device may receive a resource scheduling application request. The resource scheduling application request is used to apply to allocate an electric power resource to a power consumption device. Then, the scheduling device determines a target energy storage device from the energy storage device pool based on the resource scheduling application request, and then the scheduling device allocates an electric power resource to the power consumption device by using the target energy storage device.

In the method, an energy storage device pool is obtained through pooling of resources of an energy storage device, and resources are scheduled on demand by using the energy storage device pool, instead of being provided fixedly for one or more power consumption devices. This avoids uneven wear of energy storage devices in a same batch that is caused when some energy storage devices are repeatedly used and some other energy storage devices are not used. According to the method, leveling use of energy storage devices is implemented through automatic scheduling, and operation and maintenance workload is reduced. In addition, resources of each energy storage device can be fully utilized, so that costs of a data center are reduced.

In some implementations, the target energy storage device and the power consumption device are placed in a same cabinet in a data center. In this way, the scheduling device may directly set a working mode of the target energy storage device to a power supply mode, so that the target energy storage device supplies power to the power consumption device. In this implementation, the scheduling device does not need to use another device to move the target energy storage device or connect the target energy storage device to the power consumption device. This simplifies a scheduling procedure and reduces scheduling costs.

In some implementations, the target energy storage device is placed in a warehouse, and the scheduling device may use an execution device to move the target energy storage device from the warehouse to a cabinet in which the power consumption device is located. For one thing, capacity expansion can be implemented. For another thing, flexibility of resource scheduling can be improved.

In some implementations, the power consumption device is connected to the at least one energy storage device by using a switch array. Correspondingly, the scheduling device may close a target switch in the switch array, to enable the power consumption device to be connected to the target energy storage device. In the method, the target energy storage device does not need to be moved, so that moving time and an electricity loss generated during movement are reduced, and resource utilization is improved.

In some implementations, the energy storage device pool includes a plurality of clusters, states of health of energy storage devices in different clusters have a gradient, and the gradient is used to indicate a difference between a state of health of each cluster and a state of health of another cluster. The scheduling device can perform an anti-wear leveling policy between clusters, to avoid life exhaustion of all energy storage devices at a specific time point, reduce an overall risk of a resource scheduling system, and improve system reliability.

In some implementations, the scheduling device may determine a target cluster from the plurality of clusters based on the resource scheduling application request, and then determine a target energy storage device from the target cluster by using a wear leveling policy. Pooling management on resources of the energy storage device may be further performed based on usage of the energy storage device, to implement wear leveling, prolong a service life of the energy storage device, and further reduce costs of the data center.

In some implementations, the wear leveling policy is used to level states of health of energy storage devices in the target cluster. The wear leveling policy is used to level SoHs of energy storage devices in the target cluster, so that the energy storage devices in the target cluster may reach an end-of-life state in a same or similar time period. In this way, the energy storage devices are replaced in batch. This reduces operation and maintenance workload.

In some implementations, the scheduling device may determine whether a state of health of an energy storage device in the target cluster meets a preset condition, add the energy storage device to a candidate queue when the preset condition is met, and determine the target energy storage device from the candidate queue.

In some implementations, the scheduling device may further release the resource scheduling application request, so that the target energy storage device stops providing an electric power resource for the power consumption device. In this way, the resource can be prevented from being occupied, so that the resource can provide an electric power resource for another power consumption device.

In some implementations, the power consumption device is a device placed in a cabinet of a data center, and the scheduling device may further schedule the target energy storage device to be charged in the cabinet or on a charging pile, so that the entire system can continuously supply power to the power consumption device.

In some implementations, the scheduling device may further determine a charging loss generated when the target energy storage device is scheduled to be charged in a different cabinet or on a different charging pile, and then schedule, based on the charging loss, the target energy storage device to be charged in a target cabinet or on a target charging pile. In this way, charging losses can be reduced, and resource utilization can be improved.

In some implementations, the scheduling device may receive a plurality of resource scheduling application requests, and determine, from the energy storage device pool based on a priority sequence of the plurality of resource scheduling application requests, a target energy storage device that corresponds to the resource scheduling application request. In this way, personalized service requirements are satisfied.

In some implementations, the scheduling device may further send an operation and maintenance instruction based on alarm information of the energy storage device, where the operation and maintenance instruction is used to instruct to remove an abnormal energy storage device. In this way, automatic operations and maintenance can be implemented, and operation and maintenance costs are reduced.

In some implementations, the resource scheduling application request is used to apply to allocate an electric power resource to the power consumption device in a target time period. In other words, the method may further support application for a scheduling resource in a reserved time period, so that resource scheduling application is more convenient.

According to a second aspect, this application provides a resource scheduling apparatus for an energy storage device pool. The resource scheduling apparatus includes modules configured to perform the scheduling method according to the first aspect or any possible implementation of the first aspect.

According to a third aspect, this application provides a device. The device includes a processor and a memory. The memory is configured to store computer instructions. The processor is configured to perform, based on the computer instructions, the method according to the first aspect or any implementation of the first aspect of this application.

According to a fourth aspect, this application provides a computer-readable storage medium. The computer-readable storage medium stores instructions. When the instructions are run on a computer, the computer is enabled to perform the method according to the first aspect or any implementation of the first aspect.

According to a fifth aspect, this application provides a computer program product including instructions. When the instructions are run on a computer, the computer is enabled to perform the method according to the first aspect or any implementation of the first aspect.

In this application, based on the implementations according to the foregoing aspects, further combination may be performed to provide more implementations.

DESCRIPTION OF EMBODIMENTS

The following describes the technical solutions in this application with reference to accompanying drawings in embodiments of this application.

To facilitate understanding of the technical solutions in this application, some technical terms in this application are first described.

An energy storage device specifically refers to a device that stores energy. In embodiments of this application, the energy storage device may be a battery that stores electrical energy, for example, a lithium battery or a magnesium-aluminum battery. The energy storage device can release electrical energy after storing the electrical energy, to supply power to power consumption devices such as a cabinet and a server. Certainly, the energy storage device may also be charged, so that when the energy storage device needs to be used subsequently, electrical energy can be released to supply power to the power consumption device.

Figure 1:
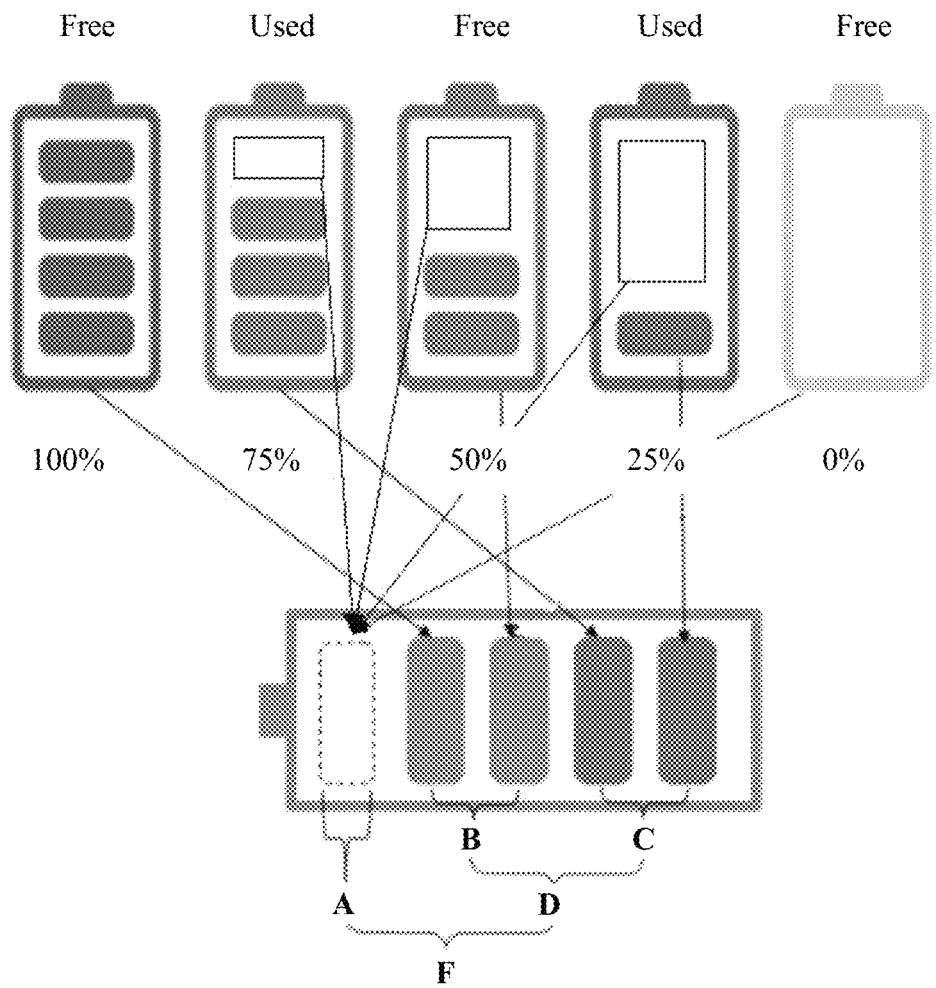
FIG. 1 is a schematic diagram of a structure of an energy storage device pool according to this application.

An energy storage device pool is a resource pool obtained by pooling at least one energy storage device. In this application, pooling means that a set including at least one energy storage device constitutes a resource pool at a logical layer, and resources provided by the energy storage device in the resource pool are uniformly scheduled. Each energy storage device has one device identifier, and the device identifier is unique. FIG. 1 provides a schematic diagram of an energy storage device pool. As shown in FIG. 1, the energy storage device pool includes five energy storage devices. Each energy storage device battery is pooled based on a capacity and an electricity quantity.

The capacity is used to indicate an attribute of an energy storage device, and may be specifically a parameter determined based on a rated capacity and a state of health (SoH). The electricity quantity is used to identify another attribute of the energy storage device, and may be specifically a parameter determined based on a capacity and a state of charge (SoC). In some examples, a capacity may be obtained by multiplying a rated capacity and an SoH, and a pool electricity quantity may be obtained by multiplying the capacity and an SoC.

Further, a pool capacity may be obtained by summing up capacities of all energy storage devices, and the pool capacity is used to indicate an attribute of an energy storage device pool. A pool electricity quantity may be obtained by summing up electricity quantities of all energy storage devices, and the pool electricity quantity is used to indicate another attribute of the energy storage device pool.

For each energy storage device, a working state of the energy storage device may be further marked. For example, a working state of an energy storage device is marked as a free state or a used state. Based on this, the pool electricity quantity may be divided into two parts. One part is a free electricity quantity, which is specifically a sum of remaining electricity quantities of an energy storage device in a free state, and the other part is a used electricity quantity, which is specifically a sum of remaining electricity quantities of an energy storage device in a used state. In addition, each energy storage device may further mark an electricity quantity to be charged, and an electricity quantity to be charged of the entire energy storage device pool may be further obtained by summing up electricity quantities to be charged of all energy storage devices.

For ease of description, in FIG. 1, a capacity of the energy storage device pool (a resource pool obtained by pooling at least one energy storage device) is denoted as F, a free electricity quantity is denoted as B, a used electricity quantity is denoted as C, a pool electricity quantity is denoted as D, and an electricity quantity to be charged is denoted as A. In this case, F=A+D, and D=B+C.

To resolve problems of heavy operation and maintenance workload and high costs in a conventional technology, this application provides a resource scheduling method for an energy storage device pool. The method may be performed by a scheduling device. Specifically, the scheduling device receives a resource scheduling application request. The resource scheduling application request is used to apply to allocate an electric power resource to a power consumption device in a target time period. Then, the scheduling device determines a target energy storage device from the energy storage device pool based on the resource scheduling application request. The scheduling device provides an electric power resource for the power consumption device by using the target energy storage device.

In the method, resources of an energy storage device are not provided fixedly for one or more power consumption devices, and the scheduling device schedules a resource of the energy storage device for a corresponding power consumption device to supply power to the power consumption device. This can avoid uneven wear that occurs in energy storage devices in a same batch and that is caused because some energy storage devices are repeatedly used and some other energy storage devices are not used. According to the method, leveling use of energy storage devices is implemented through automatic scheduling, and operation and maintenance workload is reduced. In addition, resources of each energy storage device can be fully utilized, so that costs of a data center are reduced. Moreover, pooling management on resources of the energy storage device may be further performed based on usage of the energy storage device, to implement wear leveling, prolong a service life of the energy storage device, and further reduce costs of the data center.

The following further describes the method provided in this application with reference to an application scenario of a resource scheduling method for an energy storage device pool.

Figure 2A:
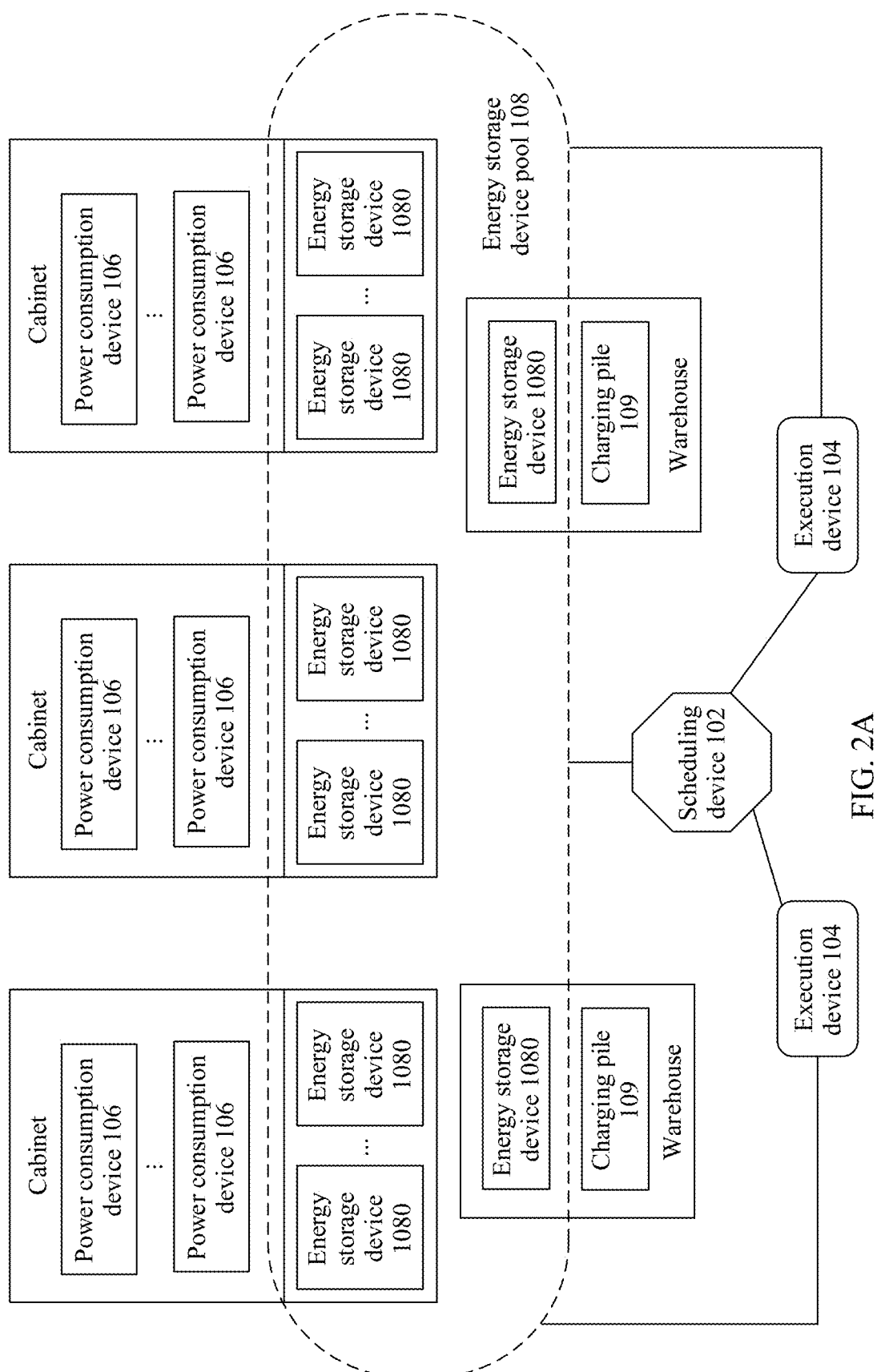
FIG. 2A is a schematic diagram of a structure of a resource scheduling system for an energy storage device pool according to this application.

FIG. 2A provides a resource scheduling system for an energy storage device pool. As shown in FIG. 2A, the resource scheduling system includes a scheduling device 102, an execution device 104, a power consumption device 106, and an energy storage device pool 108. The energy storage device pool 108 includes at least one energy storage device 1080. The scheduling device 102 may be one or more computing devices in a data center, for example, a server, or may be an end device, for example, a desktop computer or a notebook computer. The execution device 104 may be a device capable of performing a work, such as a mobile robot. The power consumption device 106 may be a device that needs power supply in a cabinet, for example, may be a server or a switch.

The power consumption device 106 may send a resource scheduling application request to the scheduling device 102. The scheduling device 102 determines a target energy storage device from the energy storage device pool 108 based on the resource scheduling application request, and then allocates an electric power resource to the power consumption device 106 by using the target energy storage device.

When the target energy storage device and the power consumption device 106 are placed in a same cabinet of the data center, the scheduling device 102 may directly set a working mode of the target energy storage device to a power supply mode, so that the target energy storage device supplies power to the power consumption device 106. When the target energy storage device and the power consumption device 106 are not placed in a same cabinet of the data center, the scheduling device 102 may further use the execution device 104 to move the target energy storage device to a cabinet in which the power consumption device 106 is located, then plug the target energy storage device to a power interface, and then set a working mode of the target energy storage device to a power supply mode, to allocate an electric power resource to the power consumption device 106 by using the target energy storage device.

In the resource scheduling system, the energy storage device 1080 may supply power by using a power interface that is provided by a cabinet and that supports hot plugging, and the energy storage device 1080 may also be charged by using the power interface. Based on this, the power consumption device 106 in the cabinet may be a consumer of a resource in the energy storage device pool 108, and the power interface in the cabinet may be used as a producer of the resource in the energy storage device pool. The scheduling device 102 is a decision maker, and the execution device 104, such as the mobile robot, is an executor of a scheduling decision.

In some implementations, the resource scheduling system may further include a charging pile 109. The energy storage device 1080 may not only be charged by using a power interface of the cabinet, but also be charged by using the foregoing charging pile 109. The charging pile 109 may be accommodated in a warehouse. In addition, the warehouse may be configured to accommodate the energy storage device 1080. In this way, a problem that a quantity and a capacity of energy storage devices 1080 are limited due to limited cabinet space is resolved, and a scenario in which a cabinet demands a large-capacity energy storage device 1080 can be supported.

Figure 2B:
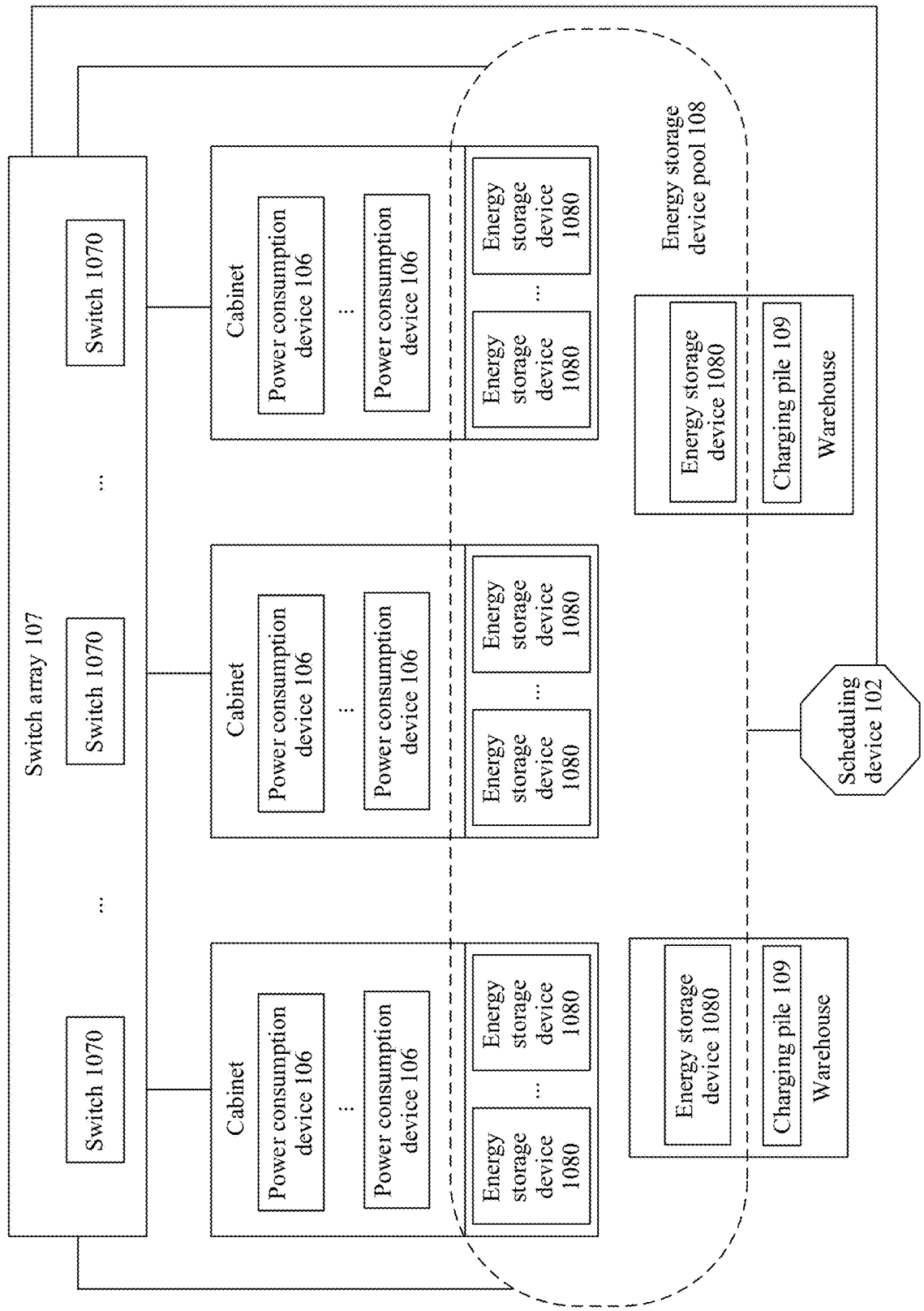
FIG. 2B is a schematic diagram of a structure of a resource scheduling system for an energy storage device pool according to this application.

FIG. 2B provides another resource scheduling system for an energy storage device pool. As shown in FIG. 2B, the resource scheduling system includes a scheduling device 102, a power consumption device 106, a switch array 107, and an energy storage device pool 108. The switch array 107 includes at least one switch 1070. The energy storage device pool 108 includes at least one energy storage device 1080.

The power consumption device 106 may send a resource scheduling application request to the scheduling device 102. The scheduling device 102 determines a target energy storage device from the energy storage device pool 108 based on the resource scheduling application request, and then allocates an electric power resource to the power consumption device 106 by using the target energy storage device.

The power consumption device 106 in a cabinet is connected to at least one energy storage device 1080 in the energy storage device pool 108 by using a switch array. The switch array is configured to connect the power consumption device 106 to any one or more energy storage devices 1080. After determining the target energy storage device, the scheduling device 102 may close a target switch in the switch array 107, so that the power consumption device 106 is connected to the target energy storage device. Then, the scheduling device sets a working mode of the target energy storage device to a power supply mode, to allocate an electric power resource to the power consumption device 106 by using the target energy storage device.

FIG. 2A and FIG. 2B are merely some examples of a resource scheduling system according to an embodiment of this application. In some implementations, the resource scheduling system may alternatively be implemented in another manner. For example, when all the energy storage devices 1080 are placed in the cabinet, the resource scheduling system may not include the execution device 104 and the switch array 107. For another example, functions of the execution device 104 and the switch array 107 may also be implemented by using another device.

The following describes, from a perspective of the scheduling device 102, a resource scheduling method for the energy storage device pool 108 provided in embodiments of this application.

Figure 3:
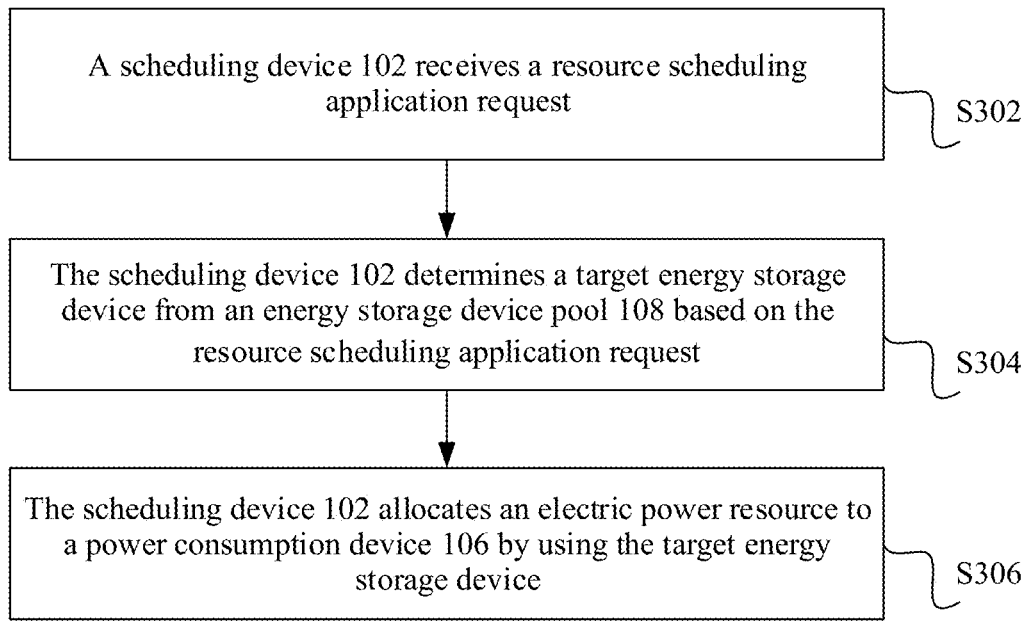
FIG. 3 is a flowchart of a resource scheduling method for an energy storage device pool according to this application.

FIG. 3 is a flowchart of a resource scheduling method for the energy storage device pool 108, and the method includes the following steps.

S302: The scheduling device 102 receives a resource scheduling application request.

The resource scheduling application request is used to apply to allocate an electric power resource to the power consumption device 106. Further, the resource scheduling application request may carry a target time period, to indicate the scheduling device 102 to allocate an electric power resource to the power consumption device 106 in the target time period. The resource scheduling application request may also carry one or more of a demand electricity quantity and a demand power, to indicate the scheduling device 102 to allocate an electric power resource to the power consumption device 106 based on the demand electricity quantity and/or the demand power.

The target time period may be determined by the power consumption device 106 based on a load power curve of the power consumption device 106 in a next statistical periodicity (for example, 24 hours or 12 hours). Specifically, the target time period may be a time period in which a power peak in the load power curve is located, or a time period in which a power value is greater than a preset value.

Specifically, the power consumption device 106 may collect a historical load power of the power consumption device 106, and generate a load power curve of the power consumption device 106 in a next statistical periodicity based on the historical load power. In some implementations, the power consumption device 106 may train a prediction model based on a historical load power by using an artificial intelligence (AI) algorithm, then obtain a load power curve of the power consumption device 106 in a next statistical periodicity through prediction by using the prediction model, and further determine a target time period based on the load power curve. The power consumption device 106 generates a resource scheduling application request based on the target time period, and sends the resource scheduling application request to the scheduling device 102.

S304: The scheduling device 102 determines a target energy storage device from the energy storage device pool 108 based on the resource scheduling application request.

Specifically, the scheduling device 102 may examine and approve the resource scheduling application request, and determine the target energy storage device from the energy storage device pool 108 after the resource scheduling application request is approved. Further, if the resource scheduling application request is not approved, the scheduling device 102 gives up performing the step of determining the target energy storage device from the energy storage device pool 108.

In some implementations, an approval rule is set for the scheduling device 102, and the scheduling device 102 may automatically examine and approve the resource scheduling application request according to the approval rule. The approval rule defines a condition for approving or rejecting the resource scheduling application request. The scheduling device 102 may determine, depending on whether a related parameter carried in the resource scheduling application request meets the condition for approving or rejecting the resource scheduling application request, whether the resource scheduling application request is approved.

In some examples, the resource scheduling application request is not approved when an electricity quantity applied for the power consumption device 106 by using the approval rule is far greater than a power consumption capability of the power consumption device 106 (for example, greater than 50% of a power consumption capability). For example, a power consumption capability of one power consumption device 106 is 2 degrees, and a demand electricity quantity carried in a resource scheduling application request sent by the power consumption device 106 is 10 degrees. In this case, the electricity quantity (specifically 10 degrees) requested by the power consumption device 106 is far greater than the power consumption capability (2 degrees) of the power consumption device 106, the scheduling device 102 does not approve the resource scheduling application request, and the scheduling device 102 may not perform a subsequent step.

When determining a target energy storage device, the scheduling device 102 may determine, as the target energy storage device based on one or more of a target time period, a demand electricity quantity, and a demand power that are indicated by a resource scheduling application request, an energy storage device 1080 that matches the one or more of the target time period, the demand electricity quantity, and the demand power. The target energy storage device is configured to provide an electric power resource to the power consumption device 106.

In some implementations, the scheduling device 102 may also receive a plurality of resource scheduling application requests. For example, the scheduling device 102 may receive resource scheduling application requests from different power consumption devices. Correspondingly, the scheduling device 102 may determine, from the energy storage device pool based on a priority sequence of the plurality of resource scheduling application requests, a target energy storage device that corresponds to the resource scheduling application request.

During specific implementation, the scheduling device 102 may store the resource scheduling application request by using a queue, for example, add the resource scheduling application request to a corresponding queue based on a priority, where each priority level corresponds to one queue. When processing the resource scheduling application request, the scheduling device 102 may extract the resource scheduling application request from a corresponding queue in descending order of priorities for processing. Further, when processing the resource scheduling application request, the scheduling device 102 may further extract the resource scheduling application request based on a quality of service (QoS) mechanism, and sequentially satisfy the resource scheduling application requests.

In some implementations, to improve a service life of the energy storage device 1080 in the energy storage device pool 108, wear leveling may be further implemented based on an attribute of each energy storage device 1080 during scheduling. When wear leveling is performed on all energy storage devices 1080 in the energy storage device pool 108, all the energy storage devices 1080 may face life exhaustion at a specific time point, which increases an overall risk of the resource scheduling system. In view of this, the energy storage device pool 108 may be further divided into a plurality of clusters. The scheduling device 102 may perform anti-wear leveling between clusters and perform wear leveling in a cluster. For one thing, a service life of the energy storage device 1080 can be prolonged. For another thing, the energy storage device 1080 can be enabled to face service life attenuation in batch, so that the resource scheduling system can continuously provide the energy storage device 1080, to avoid unexpected interruption of data and a security service due to service life attenuation of all the energy storage devices 1080, and improve system reliability.

Specifically, the scheduling device 102 may divide the energy storage device pool 108 into a plurality of clusters based on an anti-wear leveling policy and SoHs of the energy storage devices 1080 in the energy storage device pool 108. SoHs of the energy storage devices 1080 in different clusters have gradients. The gradient may be specifically used to indicate a difference between an SoH of each cluster and an SoH of another cluster. A gradient value (that is, a metric value of a gradient) may be used to measure a degree of a difference between SoHs.

For example, SoHs of energy storage devices 1080 in one cluster are close to 80% (which may be specifically 80%±5%), and SoHs of energy storage devices 1080 in another cluster are close to 50% (which may be specifically 50%±5%). In this case, the SoHs of the energy storage devices 1080 in the two clusters have a gradient, and a gradient value is specifically 80%−50%=30%.

In some implementations, the scheduling device 102 may sort the energy storage devices 1080 based on SoHs of the energy storage devices 1080, for example, sort the energy storage devices 1080 in descending order or in ascending order, and then group the energy storage devices 1080 into a plurality of clusters based on the sorting. The scheduling device 102 may equally group the energy storage devices 1080 into a plurality of clusters based on the sorting, or may determine distribution of the energy storage devices 1080 based on the sorting, and group energy storage devices 1080 that are distributed in a centralized manner into a same cluster, to obtain a plurality of clusters. In other words, quantities of energy storage devices 1080 in clusters may be equal or unequal. This is not limited in embodiments of this application.

Figure 4:
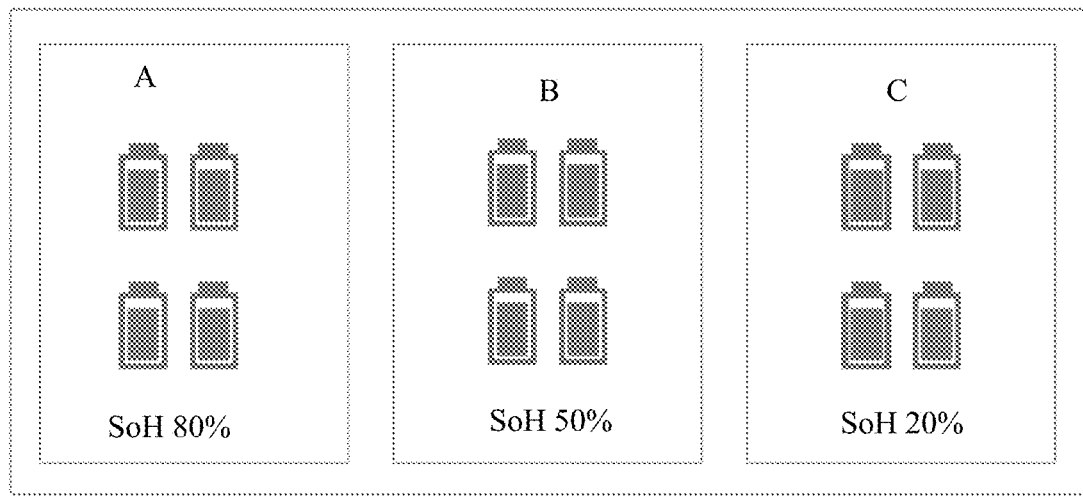
FIG. 4 is a schematic diagram of a plurality of clusters divided from an energy storage device pool according to this application.

For ease of understanding, this application further provides an example for description. As shown in FIG. 4, the energy storage device pool 108 includes twelve energy storage devices 1080, and the twelve energy storage devices 1080 are sorted in descending order. In this case, the first four energy storage devices 1080 are grouped into one cluster (denoted as a first cluster or a cluster A), the middle four energy storage devices 1080 are grouped into another cluster (denoted as a second cluster or a cluster B), and the last four energy storage devices 1080 are grouped into still another cluster (denoted as a third cluster or a cluster C).

In some implementations, a target value is set for each cluster, and the target value is an expected value of an SoH of an energy storage device in the cluster. The target value may be usually set based on an empirical value. In some implementations, one target value may correspond to one wear level. The scheduling device 102 may set a gradient value based on a quantity of wear levels, and determine a target value of each cluster based on the gradient value.

For example, when there are two wear levels: a slight wear level and a severe wear level, the gradient value may be set to a value less than or equal to 50% (that is, 100%/2), for example, may be set to 40%. Correspondingly, target values of clusters may be set to 30% and 70%, or may be set to 40% and 80%, or the like.

For another example, when there are three wear levels: a slight wear level, a normal wear level, and a severe wear level, the gradient value may be set to a value less than or equal to 33% (that is, 100%/3), for example, may be set to 30%. Correspondingly, target values of clusters may be set to 20%, 50%, and 80%, or may be set to 10%, 40%, and 70%.

In some implementations, gradient values between clusters may also be unequal. The scheduling device 102 may construct a function that uses a wear level as an independent variable and uses a target value as a dependent variable. In an example, the function may be a linear function. Then, the scheduling device 102 separately assigns values to different wear levels, to obtain corresponding function values. The function values are target values corresponding to the clusters. In some cases, the scheduling device 102 may also slightly adjust a target value in a case of gradient equalization, to change a gradient value between clusters.

The scheduling device 102 may determine a target cluster based on target values of the plurality of clusters. Specifically, the scheduling device 102 determines a deviation value of a cluster based on an SoH of an energy storage device in the cluster and a target value of the cluster.

Specifically, for any cluster, the scheduling device 102 may obtain SoHs of all energy storage devices in the cluster, and then determine an eigenvalue of the SoHs of the energy storage devices. The eigenvalue may be an average value (including an arithmetic average value or a weighted average value) of the SoHs, or a median value of the SoHs. Then, the scheduling device 102 determines a difference value between the eigenvalue and the target value as a deviation value of the cluster.

When an electricity quantity, a power, or the like of an energy storage device in a cluster is greater than or equal to the demand electricity quantity or the demand power carried in the resource scheduling application request, the scheduling device 102 may determine a target cluster from the plurality of clusters based on the resource scheduling application request. Specifically, the scheduling device 102 may use a cluster whose deviation value is greater than a first threshold as the target cluster.

Then, the scheduling device 102 may determine a target energy storage device from the target cluster by using a wear leveling policy. The wear leveling policy is used to level SoHs of energy storage devices 1080 in the target cluster, so that the energy storage devices 1080 in the target cluster may reach an end-of-life state in a same or similar time period. In this way, the energy storage devices 1080 are replaced in batch. This reduces operation and maintenance workload.

Specifically, the scheduling device 102 may determine whether an SoH of an energy storage device 1080 in the target cluster meets a preset condition, and add the energy storage device 1080 to a candidate queue when the preset condition is met. In this way, the scheduling device 102 may determine a target energy storage device from the candidate queue.

The preset condition is a condition that is preset by the scheduling device 102 and in which the energy storage device 1080 is used as a candidate device for supplying power to the power consumption device 106. The preset condition may be that a deviation between an SoH of an energy storage device 1080 and a target value is greater than a second threshold, or may be that a deviation between an SoH of an energy storage device 1080 and a target value is the largest, or the like.

In an example, the scheduling device 102 determines whether a deviation between the SoH of the energy storage device 1080 in the target cluster and the target value is greater than the second threshold, and if the deviation between the SoH of the energy storage device 1080 in the target cluster and the target value is greater than the second threshold, adds the energy storage device 1080 to a candidate queue, and determines the energy storage device 1080 from the candidate queue as the target energy storage device. For example, the scheduling device 102 randomly selects one or more energy storage devices 1080 from the candidate queue as target energy storage devices, or the scheduling device 102 selects an energy storage device 1080 having a maximum deviation as the target energy storage device. In this way, uneven attenuation states of energy storage devices 1080 in a same cluster can be avoided.

In some implementations, the first threshold and the second threshold may be equal or may not be equal. This is not limited in embodiments of this application.

For ease of understanding, the following describes in detail a process of determining the target energy storage device with reference to a specific example.

As shown in FIG. 4, target values of clusters A, B, and C are 80%, 50%, and 20%, respectively. SoHs of four batteries in the cluster A are 100%, 75%, 100%, and 75%, respectively. In this case, an average of the SoHs of the batteries in the cluster A is (100%+75%+100%+75%)/4=87.5%, and a deviation value of the cluster A is 87.5%— 80%=7.5%. Similarly, the scheduling device may determine deviation values of the cluster B and the cluster C by using the foregoing method. Assume that the deviation value of the cluster B is 45%−50%=−5%, and the deviation value of the cluster C is 25%−20%=5%. The scheduling device 102 may select a cluster whose deviation value is greater than the first threshold, for example, the cluster A, as a target cluster, and then select, from the target cluster, a battery, for example, a battery 1 or a battery 3, whose deviation from a target value is greater than the second threshold, as a target energy storage device.

It should be noted that an SoH of an energy storage device may change with a use process. Therefore, a cluster to which the energy storage device belongs also dynamically changes accordingly. For example, an energy storage device belongs to the cluster A at an initial stage, and when an SoH of the energy storage device attenuates to 50% in a use process, ownership of the energy storage device changes, specifically, from belonging to the cluster A to belonging to the cluster B. The scheduling device may periodically or in real time adjust an energy storage device included in each cluster, and select different use policies based on a status of the dynamically adjusted cluster, to implement wear leveling of energy storage devices.

S306: The scheduling device 102 allocates an electric power resource to the power consumption device 106 by using the target energy storage device.

When the target energy storage device and the power consumption device 106 are placed in a same cabinet of a data center, the scheduling device 102 directly sets a working mode of the target energy storage device to a power supply mode, to allocate an electric power resource to the power consumption device 106.

When the target energy storage device and the power consumption device 106 are not placed in a same cabinet of a data center, for example, when the target energy storage device is placed in a warehouse, or the target energy storage device is placed in another cabinet other than a cabinet in which the power consumption device 106 is located, the scheduling device 102 may use the execution device 104 to move the target energy storage device to the cabinet in which the power consumption device 106 is located.

Specifically, the scheduling device 102 may send a scheduling decision to the execution device 104, so that the execution device executes the scheduling decision, moves the target energy storage device to the cabinet in which the power consumption device 106 is located, and plugs the target energy storage device to a power interface corresponding to the power consumption device 106, to supply power to the power consumption device 106.

The scheduling decision is specifically plugging the target energy storage device to the power consumption device 106. The scheduling device 102 may send the scheduling decision to the execution device 104 in a wireless communication or wired communication manner, and the execution device 104 executes the scheduling decision, so that the target energy storage device supplies power to the power consumption device 106. The wireless communication manner may include any one or more of zigbee, Bluetooth, wireless fidelity, and the like.

The system shown in FIG. 2A may include one execution device 104, or may include a plurality of execution devices 104. The scheduling device 102 may further determine a target execution device based on a geographical location relationship among the power consumption device 106, the execution device 104, and the target energy storage device, and then send the scheduling decision to the target execution device.

The scheduling decision may include a group of scheduling commands generated by the scheduling device 102, for example, a command for obtaining a target energy storage device, a command for moving the target energy storage device to a cabinet in which the power consumption device 106 is located, and a command for plugging the target energy storage device to a power interface. The execution device 104 executes the scheduling commands to supply power to the power consumption device 106.

Further, the scheduling device 102 may further release the resource scheduling application request, so that the target energy storage device stops providing an electric power resource for the power consumption device 106. For example, after the target energy storage device supplies power to the power consumption device 106 for a time period that exceeds an applied use time period, the scheduling device 102 releases the resource scheduling application request. Correspondingly, a working state of the energy storage device is switched from a used state to a free state.

When the target energy storage device and the power consumption device 106 are not placed in a same cabinet of a data center, the scheduling device 102 may alternatively close a target switch in the switch array 107, so that the power consumption device 106 is connected to the target energy storage device. Then, the scheduling device 102 sets a working mode of the target energy storage device to a power supply mode, to supply power to the power consumption device 106.

In some implementations, the resource scheduling application request further carries a reserved electricity quantity. The reserved electricity quantity is an electricity quantity predicted by the power consumption device 106 for electricity consumption of the power consumption device 106 in a future time period. The future time period may be 1 hour after the resource scheduling application request is released, 2 hours after the resource scheduling application request is released, or the like. For example, a future time period is 1 hour. A reserved electricity quantity may be determined based on a maximum power for power supply of a power grid and electricity consumption predicted by the power consumption device 106 for loading of 1 hour. For example, the reserved electricity quantity may be the electricity consumption predicted for loading of one hour minus a product of the maximum power for power supply of the power grid and 1 H. After the scheduling device 102 releases the resource scheduling application request, an electricity quantity of the power consumption device 106 is greater than the foregoing reserved electricity quantity, and the power consumption device 106 can work normally.

In some implementations, the scheduling device 102 may further schedule the target energy storage device to be charged in the cabinet in which the power consumption device 106 is located or on the charging pile. An electricity quantity of the energy storage device 1080 is consumed in the cabinet. When a power supply power of a power supply unit (PSU) of the cabinet is greater than a total power of the power consumption device in the cabinet, an excess power may be used to charge the energy storage device 1080 in the cabinet. In some cases, when a supply power of a cabinet near the target energy storage device is less than a total power of the power consumption device 106, the scheduling device 102 may schedule the target energy storage device to be charged on the charging pile.

In some implementations, the scheduling device 102 may further determine a charging loss generated when the target energy storage device is scheduled to be charged in a different cabinet or on a different charging pile. The charging loss refers to an electricity loss generated in a charging process. The loss may include an electricity loss generated when the execution device 104 moves the target energy storage device. In some implementations, the execution device 104 further needs to plug in or plug out the target energy storage device. A charging capability of the target energy storage device may be affected by a quantity of plugging times. For example, the charging capability of the target energy storage device declines as the quantity of plugging times increases. This also generates a charging loss.

Then, the scheduling device 102 may schedule, based on the charging loss, the target energy storage device to be charged in a target cabinet or on a target charging pile. Specifically, the scheduling device 102 may obtain a physical distance needed for the execution device 104 to move the target energy storage device, then determine a weight value based on the physical distance, and obtain a charging loss in a weighted calculation manner. The physical distance includes a round-trip distance of the execution device in a movement process, for example, a first distance of the moving device moving from a current location to a warehouse, and a second distance for moving the target energy storage device to the power consumption device (cabinet) after the target energy storage device is obtained from the warehouse. Further, the scheduling device 102 may further obtain a quantity of plugging times of the target energy storage device, determine a weight value based on the quantity of plugging times (for ease of description, a weight value determined based on the physical distance may be referred to as a first weight value, and a weight value determined based on the quantity of plugging times may be referred to as a second weight value), and then obtain the charging loss in a weighted calculation manner. After the charging loss is determined in the foregoing manner, the scheduling device 102 may preferably schedule an energy storage device 1080 that has a charging capability to charge a power consumption device 106 that needs to use electricity in the future. When a capability of a power consumption device 106 is inadequate, a power consumption device 106 that is spatially adjacent to the power consumption device 106 and that has a remaining charging capability is used for charging, and a charging pile 109 in a distant warehouse is the last one to be selected for charging.

In some implementations, the energy storage device 1080 may further send alarm information. The alarm information is used to indicate an abnormal energy storage device, for example, an energy storage device 1080 in which a fault occurs or an energy storage device 1080 whose SoH is lower than a safety threshold. Correspondingly, the scheduling device 102 may send an operation and maintenance instruction based on the alarm information, and the operation and maintenance instruction is specifically used to instruct to remove the abnormal energy storage device. In this way, the execution device 104 may execute the foregoing operation and maintenance instruction to remove the abnormal energy storage device. Further, the execution device 104 may further execute an operation and maintenance instruction to plug a new energy storage device 1080. According to the method, automatic operation and maintenance of a system can be implemented, high reliability is provided, and operation and maintenance costs are reduced.

Based on the foregoing content description, this embodiment of this application provides a resource scheduling method for the energy storage device pool 108. Specifically, the scheduling device 102 receives the resource scheduling application request. Then, the scheduling device determines the target energy storage device from the energy storage device pool 108 based on the resource scheduling application request, and provides the electric power resource for the power consumption device 106 by using the target energy storage device. The energy storage device is not fixedly used for one or more power consumption devices 106, and the scheduling device 102 schedules the energy storage device 1080 for a corresponding power consumption device 106 to supply power to the power consumption device 106. This can avoid uneven wear that occurs in energy storage devices in a same batch and that is caused because an energy storage device 1080 is repeatedly used or another energy storage device 1080 is not used. According to the method, leveling use of energy storage devices 1080 is implemented through automatic scheduling, utilization of the energy storage devices 1080 is improved, operation and maintenance workload is reduced, and costs of a data center are further reduced.

It should be noted that, for ease of description, the foregoing method embodiments are represented as a series of actions. However, a person skilled in the art should appreciate that this application is not limited to the described sequence of the actions.

Another appropriate step combination that can be figured out by a person skilled in the art based on the content described above also falls within the protection scope of this application. In addition, a person skilled in the art should also appreciate that all embodiments described in this specification are preferred embodiments, and the related actions are not necessarily mandatory to this application.

The foregoing describes in detail the resource scheduling method for the energy storage device pool 108 provided in this application with reference to FIG. 1 to FIG. 4. The following describes a resource scheduling apparatus for the energy storage device pool 108 and a device that are provided in this application with reference to FIG. 5 to FIG. 6.

Figure 5:
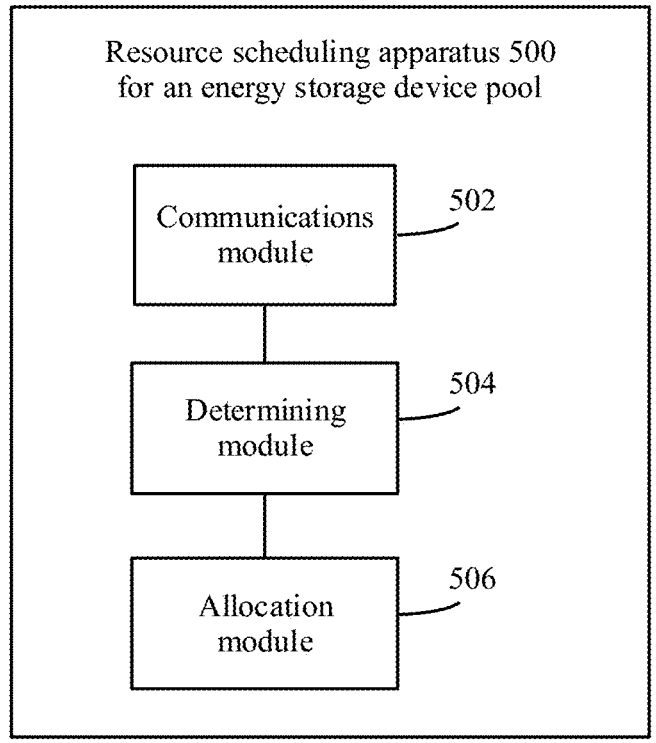
FIG. 5 is a schematic diagram of a structure of a resource management apparatus for an energy storage device pool according to this application.

FIG. 5 shows a resource scheduling apparatus 500 for the energy storage device pool 108 according to this application. The apparatus 500 includes:
- a communications module 502, configured to receive a resource scheduling application request, where the resource scheduling application request is used to apply to allocate an electric power resource to the power consumption device 106;
- a determining module 504, configured to determine a target energy storage device from the energy storage device pool 108 based on the resource scheduling application request; and
- an allocation module 506, configured to allocate an electric power resource to the power consumption device 106 by using the target energy storage device.

In some possible implementations, the target energy storage device and the power consumption device 106 are placed in a same cabinet in a data center.

In some possible implementations, the target energy storage device is placed in a warehouse.

The apparatus 500 further includes:
- a moving module, configured to move, by using the execution device 104, the target energy storage device from the warehouse to a cabinet in which the power consumption device 106 is located.

In some possible implementations, the power consumption device 106 is connected to at least one energy storage device by using a switch array.

The apparatus 500 further includes:
- a switch control module, configured to close a target switch in the switch array 107, to enable the power consumption device 106 to be connected to the target energy storage device.

In some possible implementations, the energy storage device pool 108 includes a plurality of clusters, states of health of energy storage devices 1080 in different clusters have a gradient, and the gradient is used to indicate a difference between a state of health of each cluster and a state of health of another cluster.

In some possible implementations, the determining module 504 is configured to:
- determine a target cluster from the plurality of clusters based on the resource scheduling application request; and
- determine the target energy storage device from the target cluster by using a wear leveling policy.

In some possible implementations, the wear leveling policy is used to level states of health of energy storage devices in the target cluster.

In some possible implementations, the determining module 504 is configured to:
- determine whether a state of health of an energy storage device in the target cluster meets a preset condition;
- add the energy storage device to a candidate queue when the preset condition is met; and
- determine the target energy storage device from the candidate queue.

In some possible implementations, the apparatus 500 further includes:
- a release module, configured to release the resource scheduling application request, to enable the target energy storage device to stop providing an electric power resource for the power consumption device.

In some possible implementations, the power consumption device 106 is a device placed in a cabinet of a data center, and the apparatus 500 further includes:
- a charging module, configured to schedule the target energy storage device to be charged in the cabinet or on the charging pile 109.

In some possible implementations, the charging module is specifically configured to:
- determine a charging loss generated when the target energy storage device is scheduled to be charged in a different cabinet or on a different charging pile; and
- schedule, based on the charging loss, the target energy storage device to be charged in a target cabinet or on a target charging pile.

In some possible implementations, the communications module 502 is specifically configured to:
receive a plurality of resource scheduling application requests.

The determining module 504 is specifically configured to:
determine, from the energy storage device pool based on a priority sequence of the plurality of resource scheduling application requests, a target energy storage device that corresponds to the resource scheduling application request.

In some possible implementations, the communications module 502 is further configured to:
send an operation and maintenance instruction based on alarm information of the energy storage device, where the operation and maintenance instruction is used to instruct to remove an abnormal energy storage device.

In some possible implementations, the resource scheduling application request is used to apply to allocate an electric power resource to the power consumption device 106 in a target time period.

The resource scheduling apparatus 500 for the energy storage device pool 108 according to this embodiment of this application may correspondingly perform the method described in embodiments of this application, and the foregoing and other operations and/or functions of the modules in the resource scheduling apparatus 500 are intended to implement a corresponding procedure of the method shown in FIG. 3. For brevity, details are not described herein again.

An embodiment of this application further provides a scheduling device 102. The scheduling device 102 is configured to implement a function of the resource scheduling apparatus 500 for the energy storage device pool 108 in the embodiment shown in FIG. 5.

Figure 6:
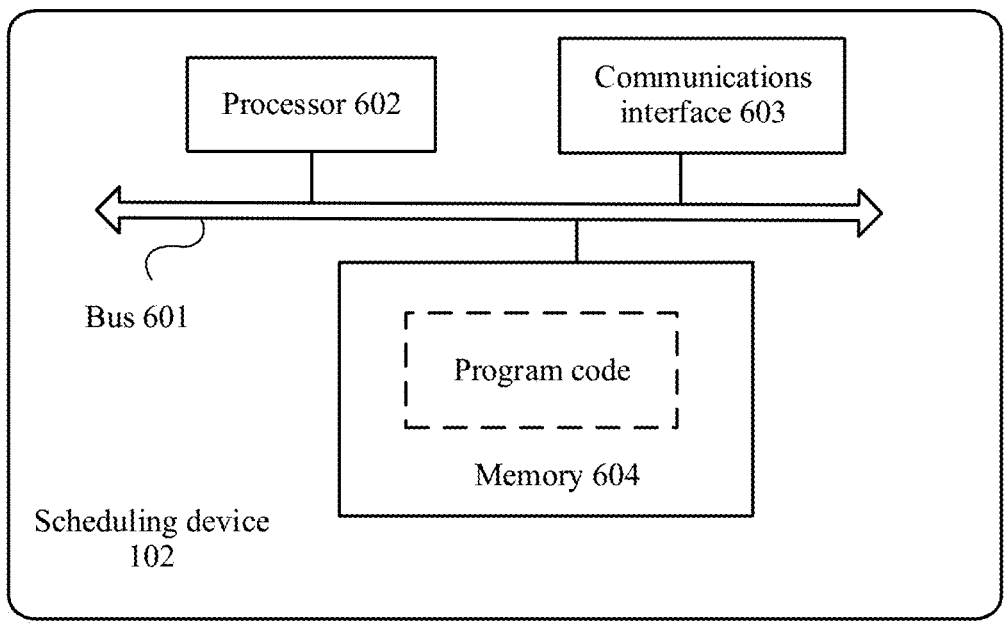
FIG. 6 is a schematic diagram of a structure of a device according to this application.

FIG. 6 is a schematic diagram of a scheduling device 102 according to this application. As shown in FIG. 6, the scheduling device 102 includes a bus 601, a processor 602, a communications interface 603, and a memory 604. The processor 602, the memory 604, and the communications interface 603 communicate with each other through the bus 601.

The bus 601 may be a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 6, but this does not mean that there is only one bus or only one type of bus.

The processor 602 may be a central processing unit (CPU). The memory 604 may include a volatile memory, for example, a random access memory (RAM). Alternatively, the memory 604 may include a non-volatile memory, for example, a read-only memory (ROM), a flash memory, an HDD, or an SSD.

The communications interface 603 is configured to communicate with the outside. For example, the communications interface 603 receives a resource scheduling application request from the power consumption device 106, sends a scheduling decision to the execution device 104, or sends an operation and maintenance instruction to the execution device 104.

The memory 604 stores executable code, and the processor 602 executes the executable code to perform the foregoing resource scheduling method for the energy storage device pool 108.

Specifically, when the embodiment shown in FIG. 5 is implemented, and the modules of the resource scheduling apparatus 500 for the energy storage device pool 108 that are described in the embodiment of FIG. 5 are implemented by using software, software or program code required for performing the functions of the determining module 504 and the allocation module 506 in FIG. 5 is stored in the memory 604.

A function of the communications module 502 is implemented by using the communications interface 603. The communications interface 603 receives the resource scheduling application request, and transmits the resource scheduling application request to the processor 602 by using the bus 601. The processor 602 executes program code that corresponds to each module and that is stored in the memory 604, for example, executes program code corresponding to the determining module 504, to perform a step of determining a target energy storage device 1080 from the energy storage device pool 108 based on the resource scheduling application request, and executes program code corresponding to the allocation module 506, to perform a step of allocating an electric power resource to the power consumption device 106 by using the target energy storage device.

It should be understood that the allocation and scheduling device 102 according to this embodiment of this application may correspond to the scheduling apparatus 500 in FIG. 5 according to the embodiment of this application. The scheduling device 600 is configured to implement operation steps of the method performed by corresponding bodies in the method in FIG. 1 to FIG. 4. For brevity, details are not described herein again.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. In addition, a specific hardware structure used to achieve a same function may be of various forms, for example, in a form of an analog circuit, a digital circuit, or a dedicated circuit. However, for this application, a software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods described in embodiments of this application.

All or some of the foregoing embodiments may be implemented by using software, hardware, firmware, or any combination thereof. When software is used to implement embodiments, all or a part of the embodiments may be implemented in a form of a computer program product.

The computer program product includes one or more computer instructions. When the computer program instructions are loaded and executed on the computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application. Any variation or replacement readily figured out by a person skilled in the art based on the specific implementations provided in this application shall fall within the protection scope of this application.

What is claimed is:

1. A resource scheduling method, wherein the method comprises:
   receiving a resource scheduling application request, wherein the resource scheduling application request applies to allocate an electric power resource to a power consumption device;
   determining a target energy storage device from an energy storage device pool based on the resource scheduling application request, wherein the energy storage device pool comprises a plurality of energy storage devices; and
   allocating the electric power resource to the power consumption device by using the target energy storage device.

2. The method according to claim 1, wherein the target energy storage device and the power consumption device are placed in a same cabinet of a data center.

3. The method according to claim 1, wherein the target energy storage device is placed in a warehouse, and the method further comprises:
   moving, by using an execution device, the target energy storage device from the warehouse to a cabinet in which the power consumption device is located.

4. The method according to claim 1, wherein the power consumption device is connected to at least one energy storage device by using a switch array; and
   the method further comprises:
   closing a target switch in the switch array, to enable the power consumption device to be connected to the target energy storage device.

5. The method according to claim 1, wherein the energy storage device pool comprises one or more clusters, states of health of energy storage devices in different clusters have a gradient, and the gradient indicates a difference between a state of health of each cluster and a state of health of another cluster.

6. The method according to claim 5, wherein the determining a target energy storage device from the energy storage device pool based on the resource scheduling application request comprises:
   determining a target cluster from the one or more clusters based on the resource scheduling application request; and
   determining the target energy storage device from the target cluster by using a wear leveling policy.

7. The method according to claim 6, wherein the wear leveling policy levels states of health of energy storage devices in the target cluster.

8. The method according to claim 6, wherein the determining the target energy storage device from the target cluster by using a wear leveling policy comprises:
   determining whether a state of health of an energy storage device in the target cluster meets a preset condition;
   adding the energy storage device to a candidate queue when the preset condition is met; and
   determining the target energy storage device from the candidate queue.

9. A computing device, comprising:
   at least one processor; and
   one or more memories coupled to the at least one processor and storing programming instructions for execution by the at least one processor to cause the computing device to:
   receive a resource scheduling application request, wherein the resource scheduling application request applies to allocate an electric power resource to a power consumption device;
   determine a target energy storage device from an energy storage device pool based on the resource scheduling application request, wherein the energy storage device pool comprises a plurality of energy storage devices; and
   allocate the electric power resource to the power consumption device by using the target energy storage device.

10. The computing device according to claim 9, wherein the target energy storage device and the power consumption device are placed in a same cabinet of a data center.

11. The computing device according to claim 9, wherein the target energy storage device is placed in a warehouse, and the programming instructions, when executed by the at least one processor, cause the computing device to:
   move, the target energy storage device from the warehouse to a cabinet in which the power consumption device is located.

12. The computing device according to claim 9, wherein the power consumption device is connected to at least one energy storage device by using a switch array; and
   the programming instructions, when executed by the at least one processor, cause the computing device to:
   close a target switch in the switch array, to enable the power consumption device to be connected to the target energy storage device.

13. The computing device according to claim 9, wherein the energy storage device pool comprises one or more clusters, states of health of energy storage devices in different clusters have a gradient, and the gradient indicates a difference between a state of health of each cluster and a state of health of another cluster.

14. The computing device according to claim 13, wherein the programming instructions, when executed by the at least one processor, cause the computing device to:
   determine a target cluster from the one or more clusters based on the resource scheduling application request; and
   determine the target energy storage device from the target cluster by using a wear leveling policy.

15. The computing device according to claim 14, wherein the wear leveling policy levels states of health of energy storage devices in the target cluster.

16. The computing device according to claim 14, wherein the programming instructions, when executed by the at least one processor, cause the computing device to:
   determine whether a state of health of an energy storage device in the target cluster meets a preset condition;
   add the energy storage device to a candidate queue when the preset condition is met; and
   determine the target energy storage device from the candidate queue.

17. A non-transitory computer-readable storage medium storing instructions which, when executed, cause a computing device to perform operations comprising:
   receiving a resource scheduling application request, wherein the resource scheduling application request applies to allocate an electric power resource to a power consumption device;

determining a target energy storage device from an energy storage device pool based on the resource scheduling application request, wherein the energy storage device pool comprises a plurality of energy storage devices; and allocating the electric power resource to the power consumption device by using the target energy storage device.

18. The computer-readable storage medium according to claim 17, wherein the target energy storage device and the power consumption device are placed in a same cabinet of a data center.

19. The computer-readable storage medium according to claim 17, wherein the target energy storage device is placed in a warehouse, and the operations comprise:

moving, by using an execution device, the target energy storage device from the warehouse to a cabinet in which the power consumption device is located.

20. The computer-readable storage medium according to claim 17, wherein the power consumption device is connected to at least one energy storage device by using a switch array; and the operations comprise:

closing a target switch in the switch array, to enable the power consumption device to be connected to the target energy storage device.

* * * * *